(12) United States Patent
Kang

(10) Patent No.: US 9,469,231 B2
(45) Date of Patent: Oct. 18, 2016

(54) FLAP ASSEMBLY OF VEHICLE CUP HOLDER

(71) Applicant: NIFCO KOREA INC., Chungcheongnam-do (KR)

(72) Inventor: Yong Goo Kang, Cheonan (KR)

(73) Assignee: NIFCO KOREA INC., Asan (KR)

( * ) Notice: Subject to any disclaimer, the term of this patent is extended or adjusted under 35 U.S.C. 154(b) by 0 days.

(21) Appl. No.: 14/766,979

(22) PCT Filed: Feb. 19, 2014

(86) PCT No.: PCT/KR2014/001348
§ 371 (c)(1),
(2) Date: Aug. 10, 2015

(87) PCT Pub. No.: WO2014/133282
PCT Pub. Date: Sep. 4, 2014

(65) Prior Publication Data
US 2015/0375658 A1 Dec. 31, 2015

(30) Foreign Application Priority Data

Feb. 26, 2013 (KR) .................. 20-2013-0001487 U

(51) Int. Cl.
*B60N 3/10* (2006.01)
(52) U.S. Cl.
CPC .............. *B60N 3/102* (2013.01); *B60N 3/106* (2013.01)
(58) Field of Classification Search
CPC ................................. B60N 3/102; B60N 3/106
USPC ....................................................... 296/37.8
See application file for complete search history.

(56) References Cited

U.S. PATENT DOCUMENTS

| 7,597,300 | B2 * | 10/2009 | Harada | .............. | A47G 23/0225 220/282 |
| 7,866,620 | B2 * | 1/2011 | Kaemmer | .............. | B60N 3/106 224/282 |
| 2004/0021048 | A1 * | 2/2004 | Schaal | ................... | B60N 3/108 248/310 |
| 2010/0200720 | A1 * | 8/2010 | Kaemmer | .............. | B60N 3/106 248/311.2 |
| 2012/0091303 | A1 * | 4/2012 | Ogawa | ................... | B60N 3/106 248/311.2 |

FOREIGN PATENT DOCUMENTS

| JP | 06-078066 U | 11/1994 |
| KR | 10-2006-0096620 A | 9/2006 |
| KR | 10-0837086 B1 | 6/2008 |
| KR | 10-2009-0040175 A | 4/2009 |
| KR | 10-2010-0109868 A | 10/2010 |

\* cited by examiner

*Primary Examiner* — Pinel Romain
(74) *Attorney, Agent, or Firm* — Patent Office of Dr. Chung Park

(57) ABSTRACT

A flap assembly of a vehicle cup holder. The flap assembly includes: a flap housing disposed on a side of a container receiver of a cup holder body and having a flap entrance, rotation guide holes on both upper sides and linear guide holes on both lower sides; a flap installed into a flap entrance of the flap housing and having support protrusion parts, rotational support protrusions inserted into the rotation guide holes, and linear support protrusions inserted into the linear guide holes; and a flap spring disposed between the flap housing and flap and configured to resiliently support the flap.

2 Claims, 6 Drawing Sheets

FIG. 1

FLAP ASSEMBLY OF VEHICLE CUP HOLDER

CROSS-REFERENCE TO PRIOR APPLICATIONS

This application is a national Stage Patent Application of PCT International Patent Application No. PCT/KR2014/001348, filed on Feb. 19, 2014 under 35 U.S.C. §371, which claims priority of Korean Patent Application No. 20-2013-0001487, filed on Feb. 26, 2013, which are all hereby incorporated by reference in their entirety.

TECHNICAL FIELD

The present invention relates to a flap assembly of a cup holder installed inside a car, and more particularly to an assembly having a flap that is installed in the flap housing and can rotate and move back and forth so that a container can be easily mounted in a container receiver and held in a stable manner during driving.

BACKGROUND TECHNIQUE

In general, a cup holder installed in a car is disposed on an audio or air conditioner control panel or on a floor control tray that is located between speed control lever and elbow compartment.

The cup holder may have a fixed size or a variable size to accommodate various fluid containers. Also, the cup holder has a structure that can firmly support the outer surface of the container during driving.

The cup holder that can accommodate fluid containers of various diameters includes a cup holder housing, where multiple supporting receptors are mounted inside the cup receiving space of the cup holder. Each of the multiple supporting receptors has a supporting member that compresses a spring as it moves away from the receiving space when a user places a cup inside the cup receiving space.

Stated differently, the multiple supporting receptors are protruding into the receiving space by the resilient force of springs. Then, when the user inserts a container into the cup receiving space, the outer surface of the container pushes the multiple supporting receptors away from the receiving space and the springs are compressed. The compressed springs firmly push the multiple supporting receptors against the outer surface of the container.

However, the conventional cup holder has difficulty in holding a container that has a relatively small waist or a large bottom area (such as a beer can having a protruding portion near its bottom) since the multiple supporting receptors may be stuck in the waist when the user dismounts such container from the cup holder. Also, for the case of a large container, the multiple supporting receptors make contact with the container near the bottom portion of the container, making the container easily fall over and spill the liquid over the car.

Accordingly, in Korean patent Serial No. 10-0837086, the present inventor suggested a cup holder that includes: a cup holder housing that has a container receiver; supporting members that is combined with a support unit and can rotate centered at the first pin, the support unit being disposed outer side of the container receiver; a spring disposed between the support unit and the supporting members and configured to push the supporting members against the container; the second pin disposed on the bottom side of supporting member; a first guide groove and a second guide groove that are disposed on the support unit and configured to guide the first pin and the second pin to move downwardly and/or sideway when a container is inserted into the container receiver; and the spring including two circular hooks and a tension bar.

However, in the previous invention, the supporting members make contact with the container at the bottom side of the container only, making the container easily fall over. Also, user cannot easily dismount a container having a small waist since the supporting members may be stuck to the waist area.

SUMMARY OF THE INVENTION

Technical Problem

The present invention is derived to resolve the problems of the prior art as discussed above and has an object to provide a vehicle cup holder that allows the user to mount/dismount a container into a container receiver in an convenient manner and holds the container in a stable manner during driving.

The Task Solution Means

In order to achieve the above and any other objects of the present invention, according to one aspect of the present invention there is provided a the flap assembly of the vehicle cup holder that includes: a container receiver; a flap housing disposed on a side of the container receiver and having a flap entrance, rotation guide holes on both upper sides and linear guide holes on both lower sides; a flap installed into the flap entrance of the flap housing and having support protrusion parts, rotational support protrusions inserted into the rotation guide holes, and linear support protrusions inserted into the linear guide holes; a flap spring disposed between the flap housing and flap and configured to resiliently support the flap.

The flap includes support protrusion parts that contact the container at two points, and the rotational support protrusions are parallel to the linear support protrusions.

Effect of Invention

The flap assembly of the vehicle cup holder of the present invention includes flaps that can rotate and move sideways along predetermined directions, allowing the user to mount/dismount the container in a convenient manner, and contact the container at two points, making the container stable during driving.

BEST MODE FOR CARRYING OUT INVENTION

Hereinafter, preferred embodiments of the present invention will be described in detail with reference to the accompanying drawings.

Figure 1:
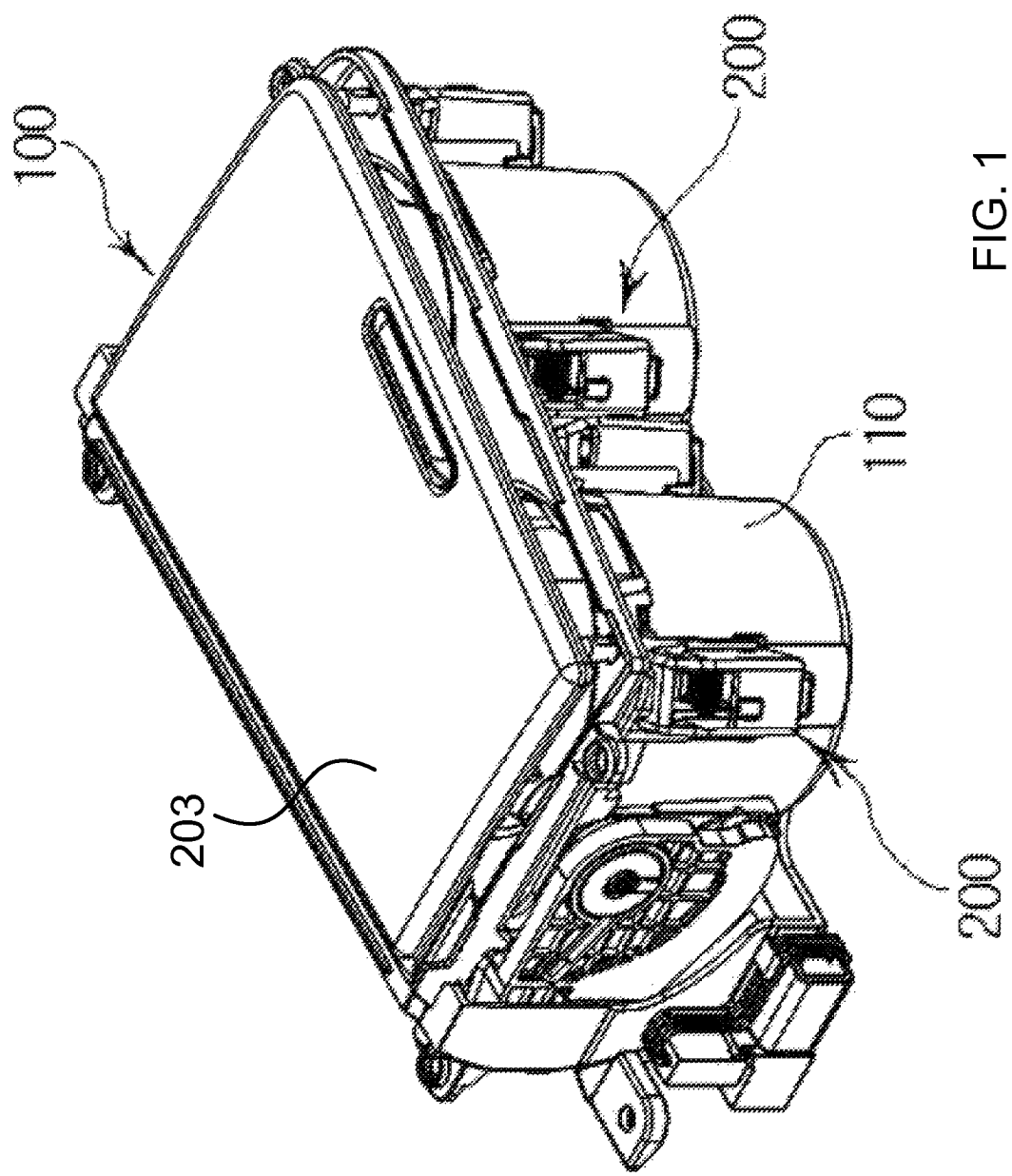
FIG. 1 shows a perspective view of a cup holder for a car according to one embodiment of the present invention.
Figure 2:
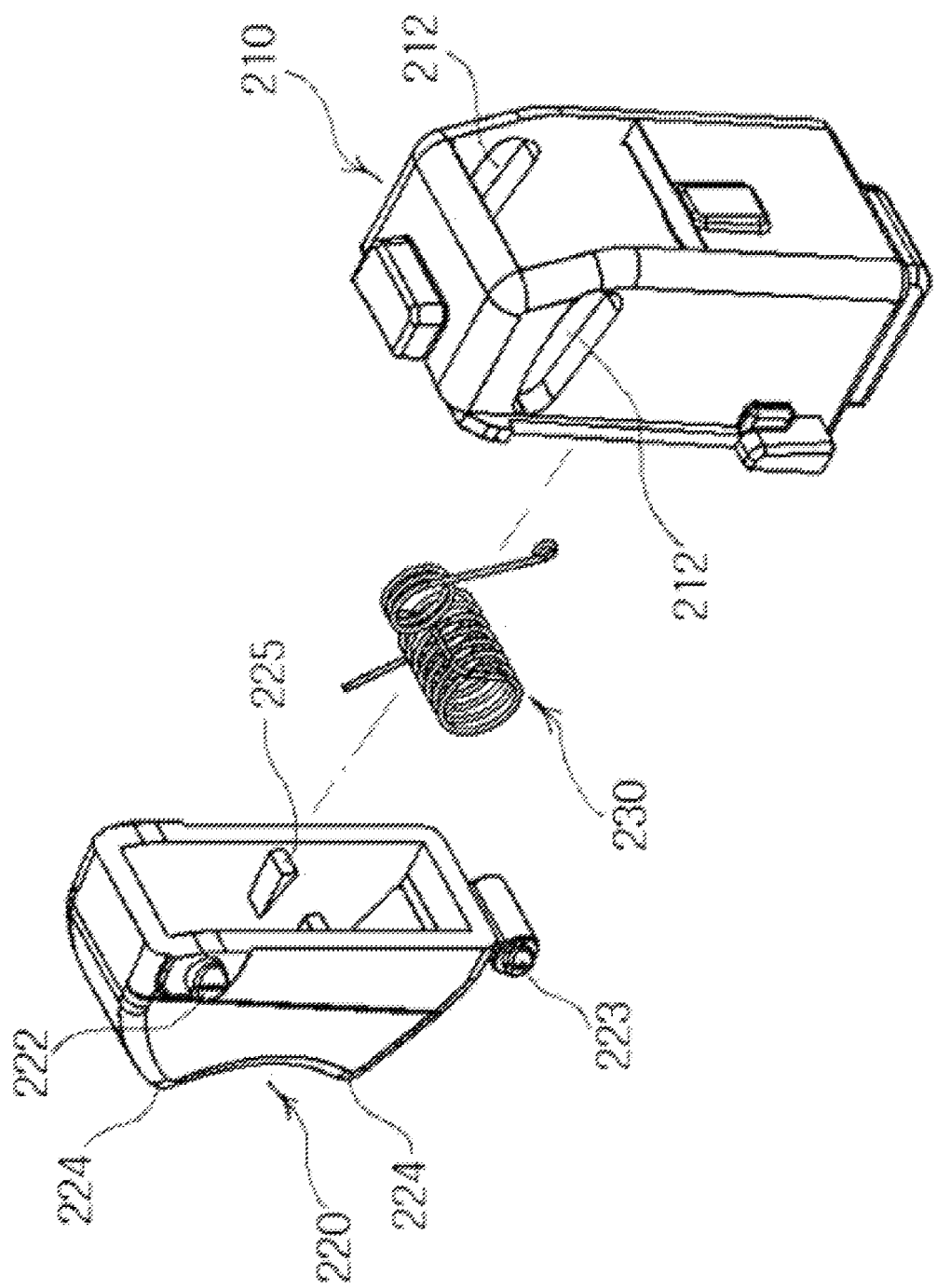
FIG. 2 shows an exploded view of the cup holder in FIG. 1.
Figure 3:
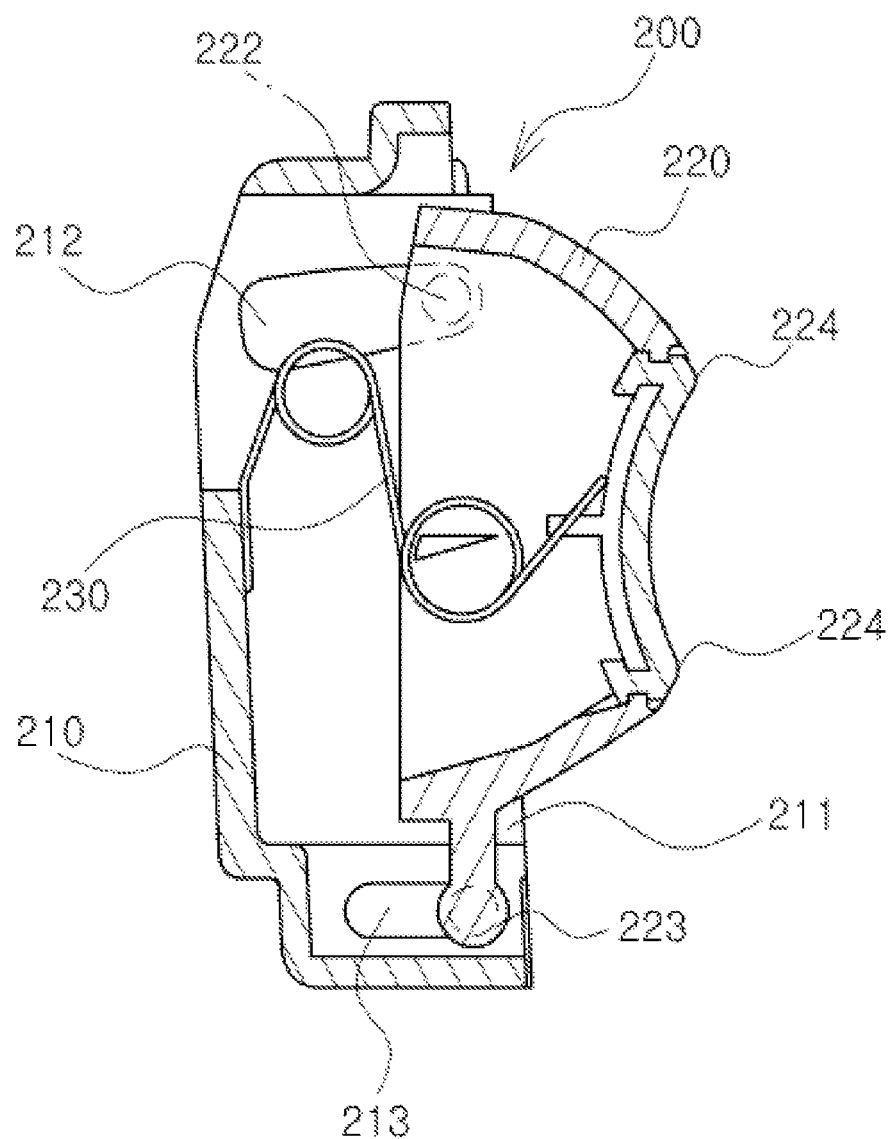
FIG. 3 shows a cross sectional view of the cup holder in FIG. 1.
Figure 4A:
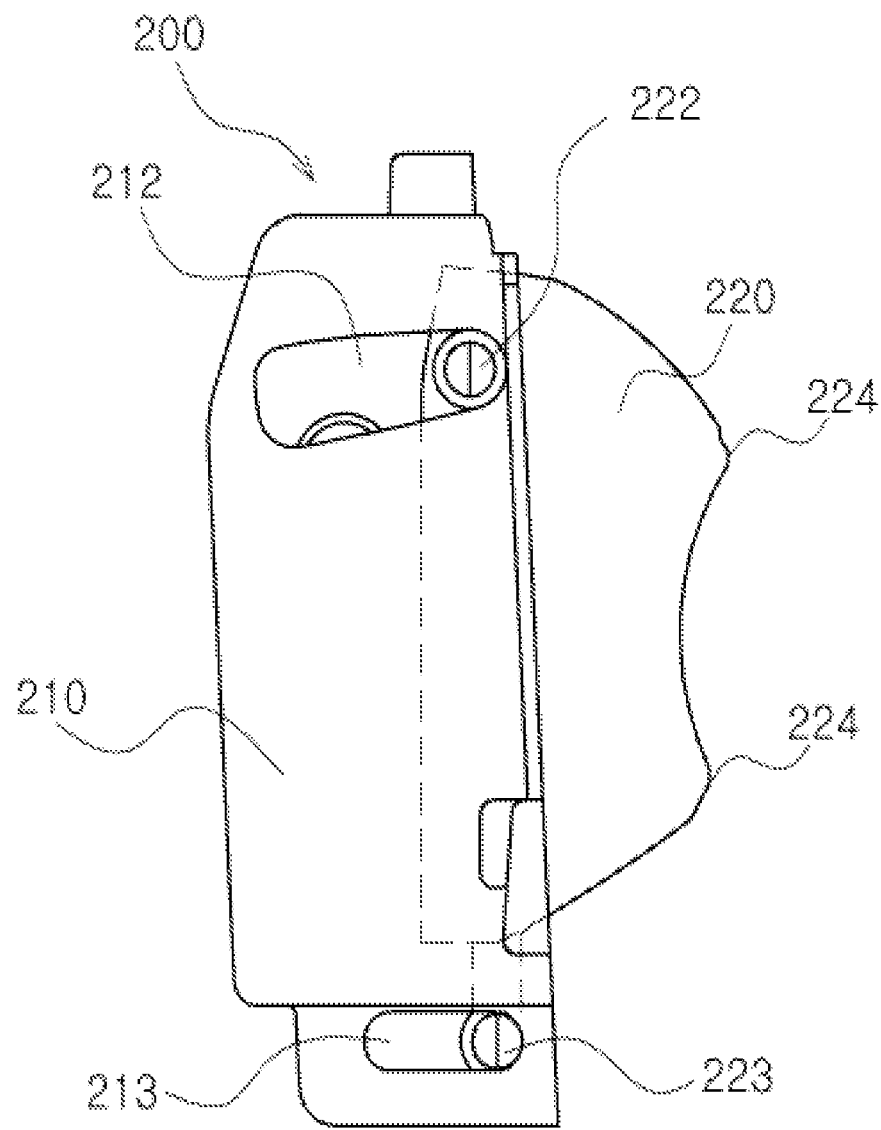
FIG. 4a-4c show the operational mechanism of the cup holder in FIG. 1.
Figure 4B:
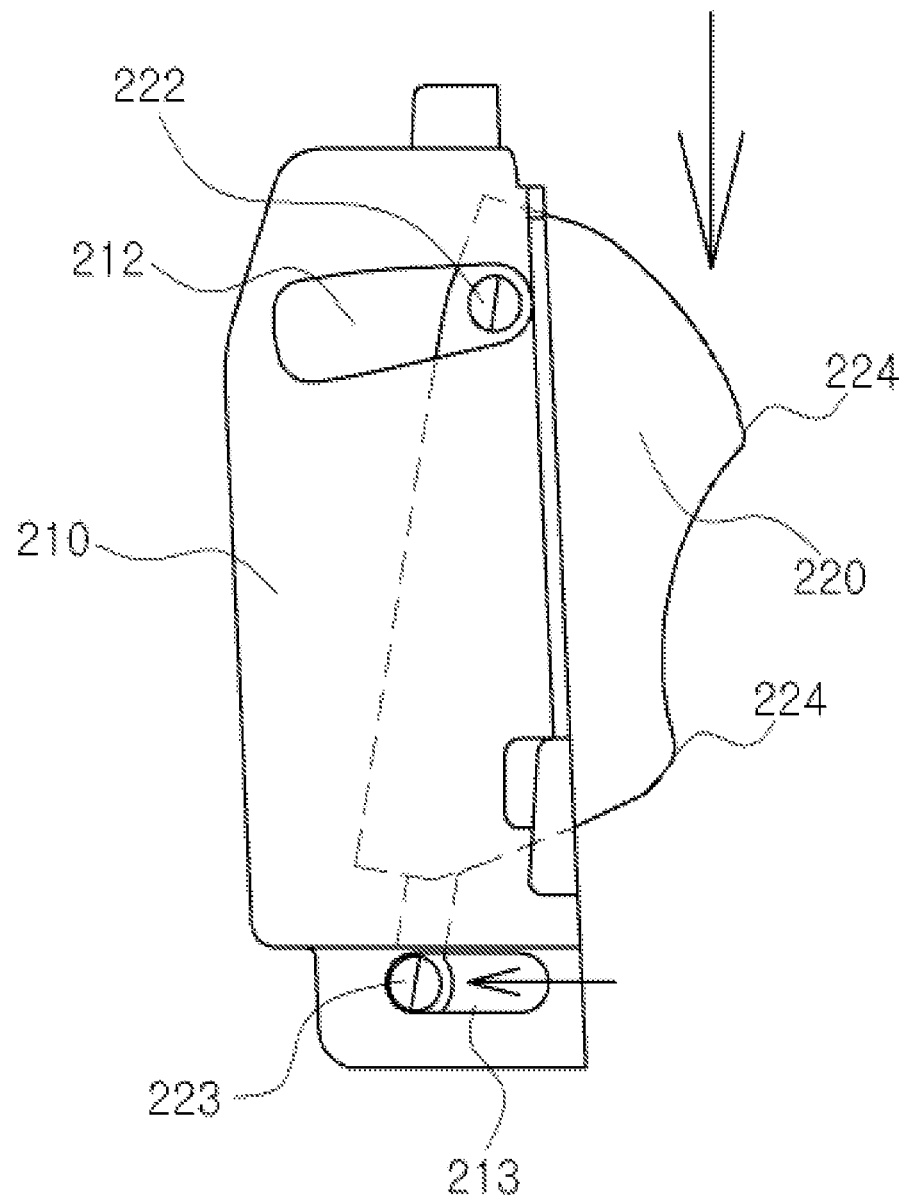
Figure 4C:
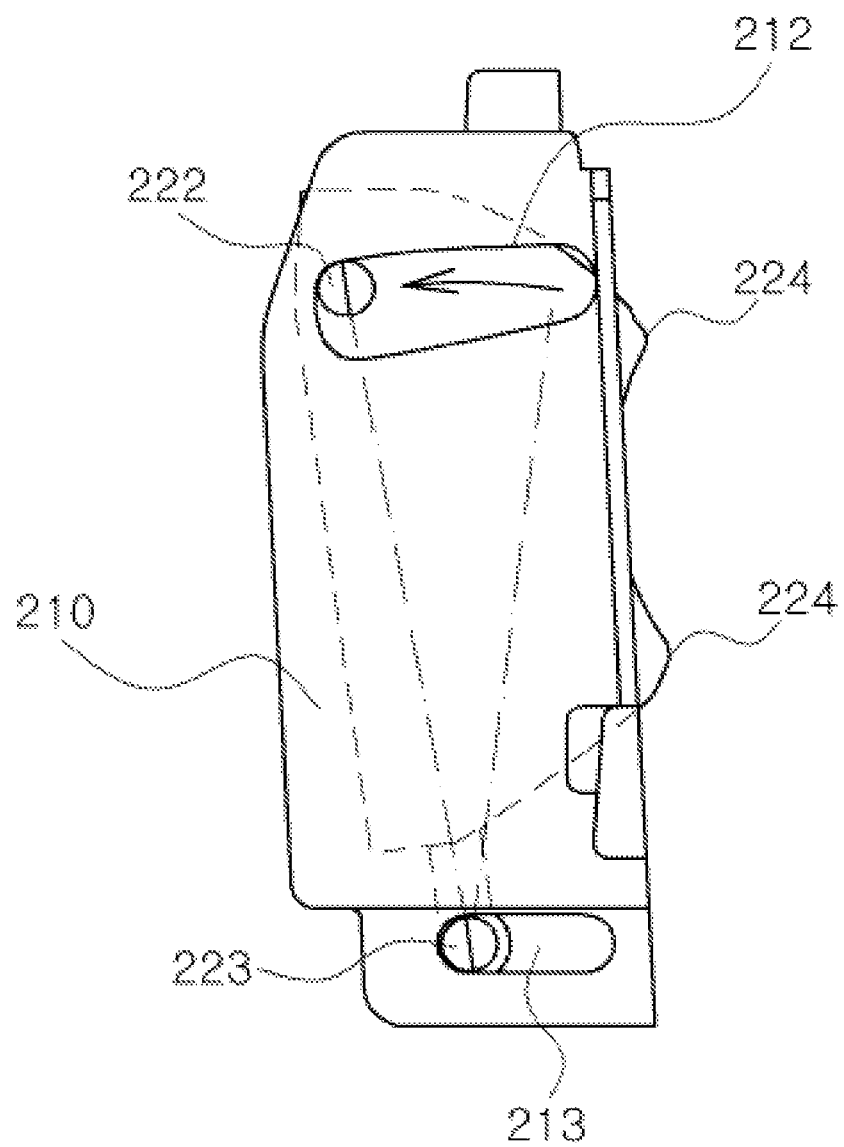

FIG. 1 shows a perspective view of a vehicle cup holder for a car according to one embodiment of the present invention. FIG. 2 shows an exploded view of the cup holder in FIG. 1. FIG. 3 shows a cross sectional view of the cup holder in FIG. 1. FIG. 4a-4c show the operational mechanism of the cup holder in FIG. 1. To mount a container into the cup holder, the user may open the cover 203, and insert the container into the container receiver 110.

As depicted in FIGS. 1-3, the flap assembly 200 of the vehicle cup holder includes: a container receiver 110;

a flap housing 210 disposed on a side of the container receiver 110 and having a flap entrance 211, rotation guide holes 212 on both upper sides and linear guide holes 213 on both lower sides;

a flap 220 installed into the flap entrance 211 of the flap housing 210 and having support protrusion parts 224, rotational support protrusions 222 inserted into the rotation guide holes 212, and linear support protrusions 223 inserted into the linear guide holes 213;

a flap spring 230 disposed between the flap housing 210 and flap 220 and configured to resiliently support the flap 220.

The flap 220 includes support protrusion parts 224 that contact the container at two points and the rotation guide holes 212 are parallel to the linear guide holes 213.

The flap 220 includes spring supports 225 on front and rear sides of its inner surface for supporting the flap spring 230.

FIG. 4a shows a side view of the flap assembly 200 when there is no container in the container receiver 110. As depicted, the flaps 220, which are supported by the resilient force of the flap spring 230, protrudes toward the front side of the flap entrance 211 (i.e., toward the right). Also, the rotational support protrusions 222, which are engaged into the rotation guide holes 212, are disposed on the rightmost side of the rotation guide holes 212. Likewise, the linear support protrusions 223, which are engaged into the linear guide holes 213, are disposed on the rightmost side of the linear guide holes 213.

FIG. 4b shows the motion of the flap 220 when the user starts mounting a container into the container receiver 110. As depicted, the upper portion of the flap 220 is pushed downwardly by the container, causing the flap 220 to rotate clockwise centered at the rotational support protrusion 222 and causing the linear support protrusions 223 to move toward the left along the linear guide holes 213. As the user further pushes the container further down, the entire flap 220 starts moving toward the flap housing 210 (i.e., toward the left).

To complete the mounting process, as shown in FIG. 4c, the rotational support protrusions 222 move toward the left along the rotation guide holes 212, causing the flap 220 to rotate counterclockwise centered at the linear support protrusion 223. Then, the support protrusion parts 224 push the container at two points to thereby hold the container in place.

The flap assembly 200 of the vehicle cup holder includes the flap 220, where the flap 220 can rotate and move sideways, allowing the user to mount/dismount a container in a convenient manner. Also, the flap 200 firmly contacts the container at two points, where the locations of the two points do not move upon completion of mounting, preventing the container from falling over during driving.

Although the following detained description contains many specifics for the purposes of illustration, those of ordinary skill in the art will appreciate that many variations and alterations to the following detains are within the scope of the invention.

What is claimed is:

1. A flap assembly of a vehicle cup holder, comprising:
    a cup holder body having a container receiver;
    a flap housing disposed on a side of the container receiver and having a flap entrance, rotation guide holes on both upper sides and linear guide holes on both lower sides;
    a flap installed into a flap entrance of the flap housing and having support protrusion parts, rotational support protrusions inserted into the rotation guide holes, and linear support protrusions inserted into the linear guide holes; and
    a flap spring disposed between the flap housing and flap and configured to resiliently support the flap,
    wherein the support protrusion parts contact a container at two points and are formed on one body.

2. A flap assembly as recited in claim 1, wherein the rotation guide holes are parallel to the linear guide holes.

* * * * *